Patented Oct. 20, 1931

1,828,690

UNITED STATES PATENT OFFICE

DANIEL WALLACE STEWART, OF OTTAWA, ONTARIO, CANADA

METHOD OF UTILIZING MAGNESIAN ROCK IN THE PREPARATION OF CALCIUM-MAGNESIUM BISULPHITE LIQUOR IN TOWERS

No Drawing. Application filed May 26, 1928. Serial No. 280,957.

This invention relates to a method of utilizing magnesium containing rock in the preparation of calcium-magnesium bisulphite liquor in towers.

Bisulphite liquors used in the cooking of wood chips in the manufacture of sulphite pulp consist of sulphurous acid and either calcium bisulphite or mixed calcium and magnesium bisulphite.

Numerous advantages have been claimed by different operators for the use of the mixed liquors of calcium and magnesium bisulphites over the straight calcium liquor. Of these the chief are: the better yield and higher quality of pulp produced, the feasibility of treating numerous kinds of wood which cannot be satisfactorily cooked with calcium bisulphite alone, the lower consumption of sulphur, the reduction or elimination of calcium monosulphite and calcium sulphate from the pulp, and the reduced necessity for carrying a high content of free sulphurous acid. In spite of these advantages the use of magnesium bisulphite has in recent years decreased considerably, due to the greater cost of its preparation. The method herein described has therefore been devised as a means of preparing cheaply and efficiently bisulphite liquors containing calcium and magnesium salts of any desired ratio within rather wide limits.

The ordinary method of preparing calcium bisulphite liquor in towers requires two or more towers in series. The towers, about 100 ft. high, are loosely filled with limestone 8" to 10" in diameter and water is fed in at the top, while cool sulphur dioxide is introduced at the bottom. The sulphur dioxide and water form sulphurous acid, which in turn attacks the limestone, liberating carbon dioxide and forming soluble calcium bisulphite. The bisulphite solution is taken from the base of the last tower of the series and is then usually fortified in sulphur dioxide in another tower filled with inert material, through which blow-off gas from the digesters is passed.

In some plants dolomite magnesium containing rock is used for the purpose of incorporating magnesia in the bisulphite liquor. Where this is done additional tower capacity is required, for reasons which will be given later.

Liquors containing both calcium and magnesium bisulphites are at present usually prepared by the milk-of-lime system. Calcined dolomite or magnesium containing limestone is used as the base, and a slurry of milk of lime is prepared by slaking the calcine in water. The absorption apparatus consists of a tall multiple-compartment tank, the upper three or four compartments forming the reaction chambers. The compartments are separated by perforated partitions and the bottom section of the tank is filled with tile blocks to give a large absorption surface for the gas. The milk of lime is fed in at the top of the tank and evenly distributed over the surface of the first compartment by any suitable means. Sulphur dioxide gas is introduced at the bottom of the tank, at which point the acid is drawn off. In the solution of the calcine insoluble calcium monosulphite and soluble magnesium monosulphite are formed, along with sulphurous acid, and this mixture passes into lower tanks where the solution is fortified in sulphur dioxide and the monosulphites are converted to bisulphites of calcium and magnesium, both of which are soluble.

The operating cost and the cost of raw material are both higher in the milk-of-lime than in the tower system, and the additional expense is justified only by the compensating advantages of the use of mixed liquor.

It is a well known fact that limestone is more soluble than dolomite and still more soluble than magnesite. In actual trial it has been found that limestone is about nine times as soluble as dolomite and the latter about thirteen times as soluble as magnesite. Obviously, therefore, if dolomite or magnesite alone is used in a tower, very considerably increased capacity over that required for limestone will have to be provided, in order to secure sufficient time for solution. This is effected in practice by using larger towers or more of them in series. Moreover, if the rock used contains any two of the minerals limestone, dolomite and magnesite in the disseminated form in which they usually occur, the more soluble one will dissolve first leaving a sludge of the less soluble. In such a case the lower portion of the tower must be filled with inert material, over which the sludge slowly passes and where it gradually goes into solution in the stronger acid liquor found at this point. This will obviously require still greater tower capacity.

The object of this invention is therefore to provide a process for the ready and economical utilization of magnesium containing rock, which will combine the advantages of the tower and milk-of-lime systems without the limitations of the former or the disadvantages of the latter.

A further object of the invention is to provide for definite control of the lime-magnesia ratio in sulphite liquor produced by the tower system, regardless of the character of the rock with which the tower is filled.

The invention thus comprises the calcination of magnesium containing rock which is then preferably reduced to a fine state of division and introduced in regulated quantities into the top of the towers usually employed in the tower system.

Calcination of the magnesium containing rock is an important step in this process, since it greatly increases the rate of solution of the contained magnesia and lime. When properly calcined these bases dissolve more rapidly even than limestone. To secure maximum solubility the calcination should be carried out at a comparatively low temperature— preferably between 800 and 1000 deg. C.— since when calcined at a high temperature the contained magnesia becomes less active chemically. One may use any reasonably pure rock containing magnesium carbonate or magnesium and calcium carbonates in the desired proportions, for all decompose readily within the temperature range given.

The next step (which if preferred may be omitted) is the reduction of the calcine to a fine state of division. If this is to be effected by grinding alone such operation will normally take place at the calcination plant, before shipment. The calcine is comparatively soft, and is therefore readily pulverized. If it is to be disintegrated by slaking alone, or by a combined slaking and crushing operation, this will ordinarily be carried out at the sulphite plant itself.

In the preferred method the resultant fines, either dry or wet, are agitated with sufficient water to give a thin slurry and this slurry is fed at a controlled rate into the water stream passing to the head of the tower, which is filled with coarse limestone or dolomite, as in the usual tower process. If desired, the fine calcine may be fed directly to the tower, in a dry state, to be carried down by the water supply. It is evident that a very close control of the amount of calcine admitted to the tower can be obtained. In the tower the finely divided calcine containing lime and magnesia, either as oxides or hydroxides, will be rapidly dissolved, due to its ready solubility and to its large surface exposure, which for the same weight of material, will be many thousands of times the area of the large pieces of coarse rock in the tower.

If coarse calcine be used it may be added to the tower in any convenient way. Its rate of solution is obviously lower than that of fine calcine, but it is nevertheless considerably higher than that of limestone.

It is evident that if sufficient calcine be added much more base will be dissolved in a given time and only one tower will be required to supply, without undue loss of sulphur dioxide, all the combined acid necessary. In actual trial it has been found that if sufficient fine calcine is added to satisfy the sulphur dioxide present very little limestone goes into solution. In consequence the composition of the solution can be varied from straight calcium bisulphite to approximately that of the mixed bisulphites in the ratio in which the magnesia and lime occur in the calcine.

To further illustrate this point the results of the following tests are given. A five-foot glass tower $1\frac{1}{2}''$ in diameter was filled with commercial limestone about $5/8''$ in size. Sulphur dioxide gas was introduced at the bottom and water at the top. Fine calcined magnesium containing rock containing CaO 23% and MgO 72% was added to the water feed and samples of liquor were collected at the base. The following table illustrates the effect of additions of calcine.

|  | Ratio, $\frac{CaO}{MgO}$ |
|---|---|
| No calcine added | 200.00 |
| 2 gm. calcine added every 20 minutes | 1.37 |
| 2 gm. calcine added every 15 minutes | 1.00 |
| 2 gm. calcine added every 5 minutes | 0.64 |

In every case all the calcine went into solution, and in the last instance very little limestone was dissolved, over half of the lime being derived from the magnesium containing rock.

It is obvious that for the adoption of the proposed process present tower equipment will require but slight modifications and additions. In new installations the cost of these changes will be more than offset by the saving resulting from the reduction in tower capacity.

It will thus be apparent that, in addition to achieving the objects above set forth, the process of this invention has very important secondary advantages, which may be summarized as follows:

1. The quantity of calcine fed can be readily varied, thus permitting the combined-acid content of the liquor to be readily maintained, even in cold weather.

2. The number or size of towers required can be considerably reduced.

3. The loss of sulphur dioxide in the effluent gases from the tower is materially reduced, for the following reasons:

(a) The calcine has greater absorptive power than limestone.

(b) The volume of gas will be reduced with the substitution of calcine for raw rock, due to the fact that the carbon dioxide has already been expelled in calcination. The smaller volume of gases will obviously move at a lower velocity, affording additional time for the absorption of sulphur dioxide. It is also evident that the smaller volume of gases will carry less sulphur dioxide out of the tower.

What I claim and desire to secure by Letters Patent is:

1. A method for the utilization of magnesium containing rock in the preparation of magnesium-calcium bisulphite liquors in towers which comprises calcining the magnesium containing rock, feeding the calcine and water to the top of a tower and passing sulphur dioxide through said tower countercurrent to said water and calcine to react with the latter.

2. A method for the utilization of magnesium containing rock in the preparation of magnesium-calcium bisulphite liquors in towers which comprises calcining the magnesium containing rock, reducing the calcine to a fine state of division, feeding the fine calcine and water to the top of a tower and passing sulphur dioxide through said tower countercurrent to said water and calcine to react with the latter.

3. A method for the utilization of magnesium containing rock in the preparation of magnesium-calcium bisulphite liquors in towers which comprises calcining the magnesium containing rock at a temperature between 800 and 1000 deg. C., reducing the calcine to a fine state of division, feeding the fine calcine and water to the top of a tower and passing sulphur dioxide through said tower countercurrent to said water and calcine to react with the latter.

4. A method for the utilization of magnesium containing rock in the preparation of magnesium-calcium bisulphite liquors in towers which comprises calcining the magnesium containing rock, reducing the calcine to a fine state of division by slaking with water, feeding the fine calcine and water to the top of a tower and passing sulphur dioxide through said tower countercurrent to said water and calcine to react with the latter.

5. A method for the utilization of magnesium containing rock in the preparation of magnesium-calcium bisulphite liquors in towers which comprises calcining the magnesium containing rock, reducing the calcine to a fine state of division by a combined slaking and crushing operation, feeding the fine calcine and water to the top of a tower and passing sulphur dioxide through said tower countercurrent to said water and calcine to react with the latter.

6. A method for the utilization of magnesium containing rock in the preparation of magnesium-calcium bisulphite liquors in towers which comprises calcining the magnesium containing rock, reducing the calcine to a fine state of division, feeding the fine calcine as a slurry into the water supply going to the top of a tower and passing sulphur dioxide upwardly through said tower to react with said calcine.

7. A method for utilization of magnesium containing rock in the preparation of bisulphite liquors in towers which comprises calcining the magnesium containing rock, reducing the calcined rock to a fine state of division, introducing the calcined rock into the top of a tower through which sulphur dioxide and water flow in counter current relation, and controlling the combined-acid content of the liquor by regulating only the quantity of calcined magnesia rock introduced to the tower.

In testimony whereof I have affixed my signature.

DANIEL WALLACE STEWART.